United States Patent
Lee et al.

(10) Patent No.: US 9,771,521 B2
(45) Date of Patent: Sep. 26, 2017

(54) SIMULTANEOUS PRETREATMENT METHOD OF HEAVY HYDROCARBON DISTILLATE AND LIGNOCELLULOSIC BIOMASS USING SOLVENT

(71) Applicant: Industry-Academic Cooperation Foundation, Yonsei University, Seoul (KR)

(72) Inventors: Chang Ha Lee, Seoul (KR); Jae Hyuk Lee, Seoul (KR); Tran Tan Viet, Seoul (KR); Ik Sung Ahn, Seoul (KR); Doo Wook Kim, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 212 days.

(21) Appl. No.: 14/367,659

(22) PCT Filed: Dec. 28, 2012

(86) PCT No.: PCT/KR2012/011721
§ 371 (c)(1),
(2) Date: Jun. 20, 2014

(87) PCT Pub. No.: WO2013/100695
PCT Pub. Date: Jul. 4, 2013

(65) Prior Publication Data
US 2015/0218459 A1    Aug. 6, 2015

(30) Foreign Application Priority Data

Dec. 30, 2011  (KR) .................. 10-2011-0146959
Dec. 26, 2012  (KR) .................. 10-2012-0153418

(51) Int. Cl.
*C10G 1/08*  (2006.01)
*C10G 47/22*  (2006.01)

(52) U.S. Cl.
CPC ............. *C10G 1/083* (2013.01); *C10G 1/086* (2013.01); *C10G 47/22* (2013.01); *Y02P 30/20* (2015.11)

(58) Field of Classification Search
CPC ... C10G 3/50; C10G 3/48; C10G 3/46; C10G 3/47
(Continued)

(56) References Cited

U.S. PATENT DOCUMENTS 4,559,127 A    12/1985  Paspek, Jr.

FOREIGN PATENT DOCUMENTS

DE    EP 1862527 A1 * 12/2007  ............. C01B 3/326
EP    1862527 B1    1/2011
(Continued)

OTHER PUBLICATIONS

JP 2008-297468 A_English, Machine translated English document.*
(Continued)

*Primary Examiner* — In Suk Bullock
*Assistant Examiner* — Youngsul Jeong
(74) *Attorney, Agent, or Firm* — Mintz Levin Cohn Ferris Glovsky and Popeo, P.C.; Linyu L. Mitra

(57) ABSTRACT

A method of reforming a heavy hydrocarbon distillate, which includes treating a heavy hydrocarbon distillate and a lignocellulosic biomass with a solvent, is provided.

The method can be useful in maximizing conversion of the heavy hydrocarbon distillate into higher value-added distillate, for example, naphtha and a middle distillate, and allowing a sulfur compound produced by the decomposition of a heavy hydrocarbon distillate to catalyze pretreatment of the lignocellulosic biomass.

Also, oxygen, hydroxymethylfurfural (HMF), levulinic acid, formic acid, and sulfuric acid produced by decomposition of
(Continued)

the lignocellulosic biomass can catalyze decomposition of a heavy hydrocarbon distillate and lignocellulosic biomass, thereby activating decomposition of a heavy hydrocarbon distillate.

7 Claims, 4 Drawing Sheets

(58) Field of Classification Search
USPC .................................................. 585/324, 639
See application file for complete search history.

(56) References Cited

FOREIGN PATENT DOCUMENTS

| | | | |
|---|---|---|---|
| JP | 3508812 B | * | 3/2004 |
| JP | 3508812 B2 | | 3/2004 |
| JP | 2008050538 A | | 3/2008 |
| JP | 2008297468 A | * | 12/2008 |
| JP | 2008297468 A | | 12/2008 |
| KR | 1020050119372 | | 12/2005 |
| KR | 20100107459 | | 5/2010 |

OTHER PUBLICATIONS

JP 3508812 B_English, Machine translated English document.*
Adjaye, Catalytic conversion of biomass-derived oils to fuels and chemicals, 1993, A Ph.D. thesis submitted to the University of Saskatchewan.*

* cited by examiner

[Figure 1]
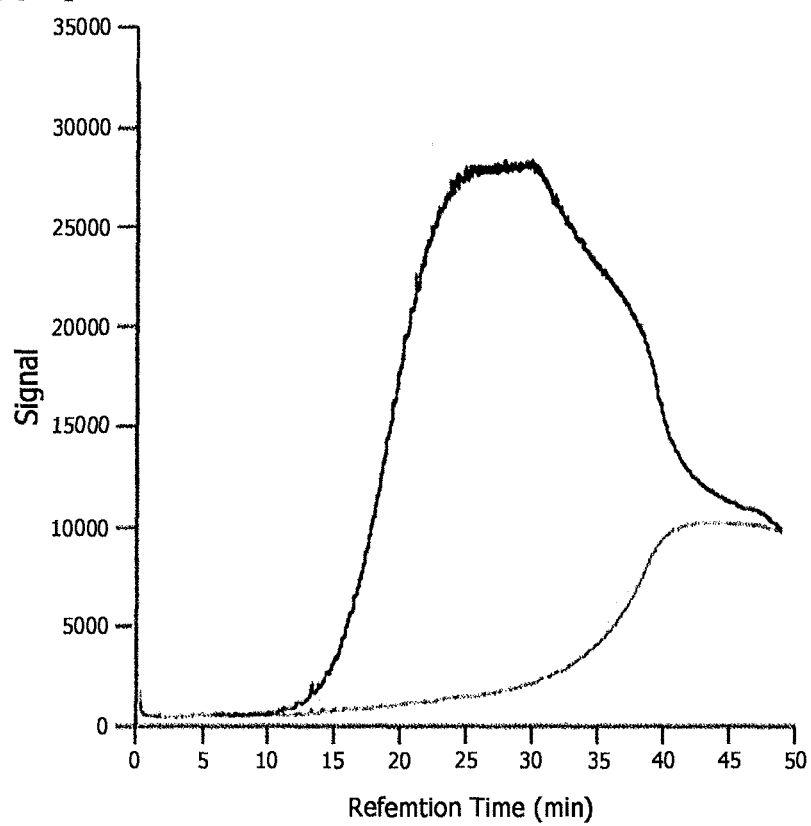

【Figure 2】
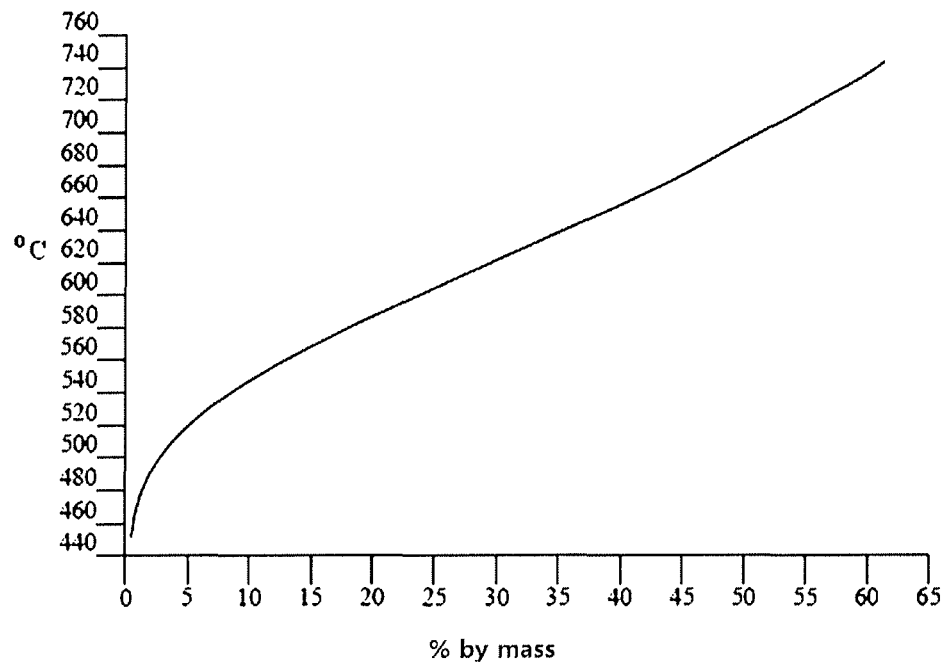
% by mass
【Figure 3】
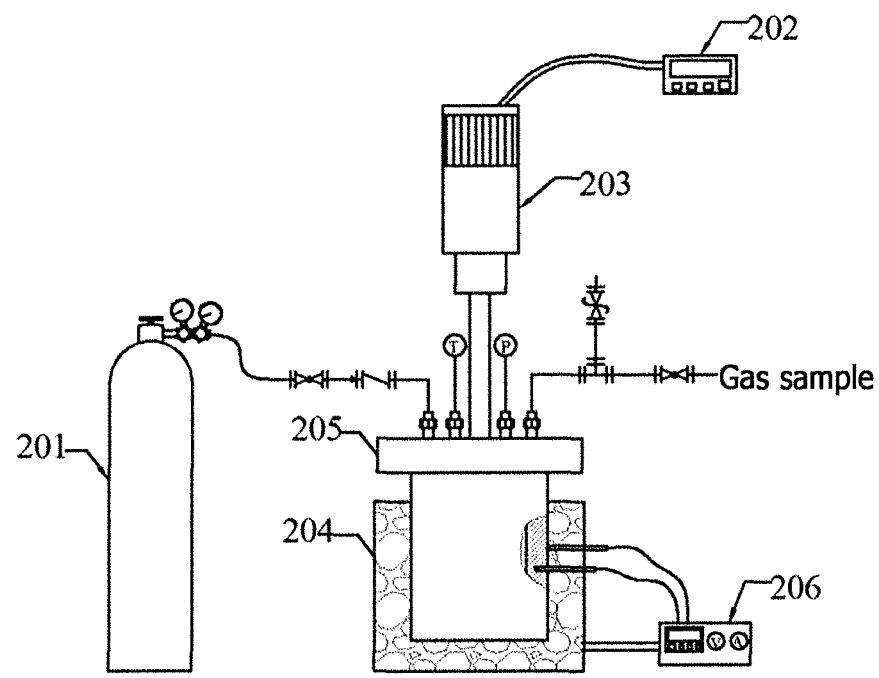

[Figure 4]
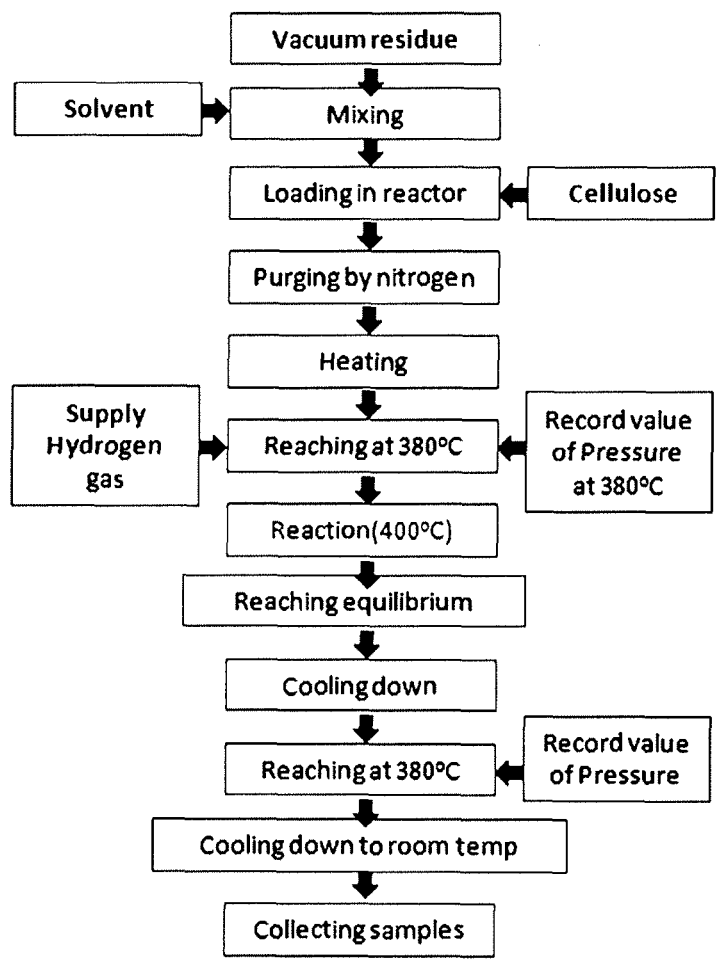

[Figure 5]
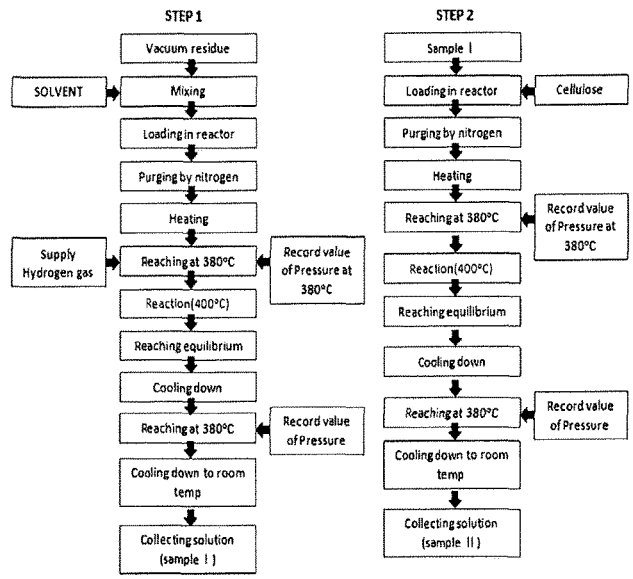
[Figure 6]
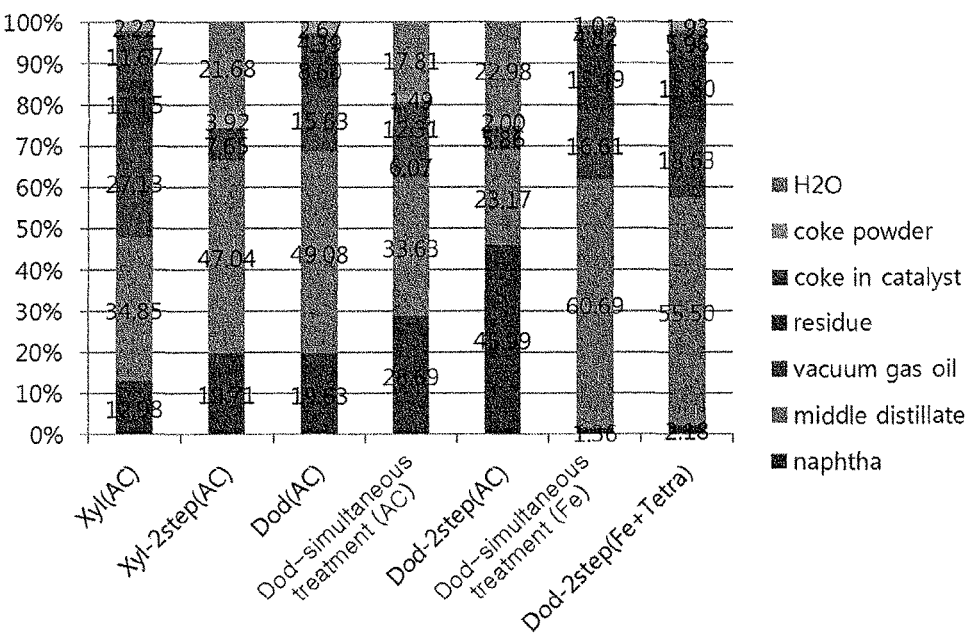

SIMULTANEOUS PRETREATMENT METHOD OF HEAVY HYDROCARBON DISTILLATE AND LIGNOCELLULOSIC BIOMASS USING SOLVENT

CROSS-REFERENCE TO RELATED APPLICATIONS

This application is a national stage application, filed under 35 U.S.C. §371, of International Application No. PCT/KR2012/011721, filed Dec. 28, 2012, which claims priority to and the benefit of Korean Patent Application No. 10-2011-0146959, filed Dec. 30, 2011, and Korean Patent Application No. 10-2012-0153418, filed Dec. 26, 2012, the contents of each of which are incorporated herein by reference in their entireties.

TECHNICAL FIELD

The present invention relates to pretreatment method of a heavy hydrocarbon distillate and a lignocellulosic biomass using a solvent.

More particularly, to a pretreatment method of converting a low-grade heavy hydrocarbon distillate and a lignocellulosic biomass into a higher value-added hydrocarbon distillate using a solvent as a medium.

BACKGROUND ART

In recent years, demands for transportation fuels, especially gasoline goods, have continuously increased, but demands for heavy oil goods such as bunker oil have decreased. However, the lack of high-quality crude oil results in an increase in percentage of high-sulfur and heavy crude oil in the crude oil currently being produced. In addition, with concerns about the dearth of petroleum resources, the need to develop technology for preparing light petroleum goods and distillates of petrochemical raw materials having a higher added value by upgrading inexpensive heavy hydrocarbon distillate such as bitumen that is a substitute for crude oil, and heavy fraction, which are produced during refinement of crude oil, is continuously being proposed.

Representative examples of such low-grade heavy distillate (heavy hydrocarbon distillate) includes vacuum residues which are bottom distillates in a vacuum distillation column (for example, those which are obtained at a pressure of approximately 25 to 100 mmHg and have an atmospheric equivalent boiling point of approximately 813.15 K or higher) during a process of refining crude oil. Since such low-grade heavy distillates have a low H/C ratio and a high viscosity property, they may not be upgraded easily. Also, the heavy hydrocarbon distillate, especially vacuum residues, typically have high contents of sulfur compounds, nitrogen compounds, oxygen compounds and heavy metals (vanadium, nickel, iron, and the like), as well as components having condensed polyaromatic rings such as asphaltene.

In this regard, various methods of upgrading the heavy hydrocarbon distillate have been proposed. By way of example, a process of converting a low-grade heavy hydrocarbon distillate or a high boiling point distillate into a higher value-added distillate having a lower boiling point has been proposed. Examples of the above-described conversion process include a cracking process, a hydrocracking process, a catalytic cracking process, and a steam cracking process. However, the above-described conversion process involves severe operating conditions such as high-temperature and high-hydrogen pressure conditions, and a hydration catalyst using a weakly acidic support is used to inhibit formation of cokes.

Meanwhile, a method of treating and upgrading crude oil or heavy hydrocarbon distillate in a supercritical medium or solvent is currently being developed. For example, a method of recovering distillate having a reduced content of asphaltene, sulfur compounds, nitrogen compounds or metals as well as of a reduced content of heavy components by bringing a stream of heavy hydrocarbon distillate into contact with water in a supercritical state to convert the stream of heavy hydrocarbon distillate into a reformed heavy fraction (Korean Unexamined Patent Application Publication No. 2010-0107459, etc.), a method of decomposing a heavy hydrocarbon distillate under supercritical conditions of a solvent such as an aliphatic hydrocarbon (dodecane, normal hexane, cyclohexane, etc.) (Japanese Unexamined Patent Application Publication No. 2008-297468, etc.), and a method of converting high boiling point hydrocarbon distillate such as residues into low boiling point hydrocarbon distillate under supercritical conditions of an acid solution using a halogen or hydrogen halide as a catalyst (U.S. Pat. No. 4,559,127, etc.) are known in the related art.

Most of the methods known in the prior art are methods of converting heavy hydrocarbon distillate into low boiling point hydrocarbon distillate in the presence of a catalyst using water or an aliphatic hydrocarbon solvent as a supercritical medium. In this case, representative higher added value hydrocarbon distillate which can be obtained from the upgrading process include naphtha (boiling point: IBP to 177° C.), and middle distillates (boiling point: 177 to 343° C.). However, when a solvent for supercritical media according to the prior art is used, the heavy hydrocarbon distillate may be converted into naphtha and middle distillates, but a large amount of gas oil, residues etc are obtained. Therefore, this process has limits in enhancing a rate of conversion into a low boiling point distillates (i.e., a light fraction) such as naphtha and middle distillates. Also, since there is a high change in compositions of the hydrocarbon distillates converted at a hydrogen pressure, this conversion process has a problem in that it should be performed at a relatively high hydrogen partial pressure to convert the heavy hydrocarbon distillate into the higher added value distillates such as low boiling point distillate (for example, naphtha and middle distillates).

Therefore, an operating procedure may be performed under a lower hydrogen pressure condition than in the prior art, and there is a need for a pretreatment process capable of maximizing recovery of the low boiling point distillates such as naphtha or middle distillates.

Also, the need for alternative energy has been increasingly required with exhaustion of fossil fuels. Therefore, lignocellulosic biomasses which can be converted into energy have been issued as important resources. Lignocellulosic biomasses accounting for a majority of biomasses present on the Earth have attracted attention as useful resources, which are produced at an amount of $10^7$ ton every year all over the world. The lignocellulosic biomasses are expected to replace petroleum since it can be subjected to glycosylation and fermentation to produce useful materials such as fuels (for example, bioethanol, etc.) and chemical derivatives while carbon dioxide is emitted at the same time. According to the "Global Biofuels Outlook 2007," the biofuel promoting policies were adopted by 40 of 50 countries surveyed, and an act of introduction of biofuels was legislated in 27 countries.

Among the lignocellulosic biomasses, lignocellulose is known as a composite consisted of cellulose (40 to 50%), hemicellulose (25 to 35%) and lignin (15 to 20%). In glycosylation of lignocellulosic biomasses, it is very difficult but important to decompose non-degradable cellulose so as to produce glucose with high efficiency. This is because glucose becomes a main fermentation source to produce biofuels, various compounds and biomaterials. However, an enzyme for glycosylation of cellulose (i.e., a cellulase) does not easily gain access to the lignocellulosic biomasses since cellulose is firmly surrounded by lignin and hemicellulose and has a crystal structure. Therefore, the lignocellulosic biomasses show a glycosylation rate of less than 20% of the theoretical yield when they do not undergo a pretreatment process for removing lignin and hemicellulose and collapsing the crystal structure of cellulose.

Dilute acid pretreatment used for pretreatment of lignocellulose, ammonia fiber expansion (AFEX) and hot water pretreatment have problems in that reactions at a high temperature, the use of toxic materials and solvents, and generation of by-products result in hindrance to a subsequent biological conversion process. Hence, a separate neutralization process should be performed after pretreatment, which results in an increase in additional costs.

Therefore, there is a demand to develop technology for removing/decomposing lignin and destructuring cellulose as basic technology through analysis and identification of the molecular structure of lignocellulose.

DISCLOSURE

Technical Problem

The present invention is directed to providing a pretreatment process of converting a low-grade heavy hydrocarbon distillate and a lignocellulosic biomass into a higher value-added hydrocarbon distillate using a solvent as a medium.

Technical Solution

One aspect of the present invention provides a method of reforming a heavy hydrocarbon distillate, which includes treating a heavy hydrocarbon distillate and a lignocellulosic biomass with a solvent.

In the present invention, the hydrocarbon distillate may be reformed by simultaneously treating a mixture of the heavy hydrocarbon distillate and the lignocellulosic biomass with the solvent.

In the present invention, the hydrocarbon distillate may also be reformed by producing a product by treating the heavy hydrocarbon distillate with the solvent; and allowing the product to react with the lignocellulosic biomass.

Advantageous Effects

The conversion process of the heavy hydrocarbon distillate using a solvent as a medium according to the present invention can maximize conversion of the heavy hydrocarbon distillate into higher value-added distillate, for example, low boiling point distillates such as naphtha and a middle distillate, and allow a sulfur compound produced by decomposition of the heavy hydrocarbon distillate to catalyze pretreatment of the lignocellulosic biomass. Also, oxygen, hydroxymethylfurfural (HMF), levulinic acid, formic acid, and sulfuric acid produced by decomposition of the lignocellulosic biomass can catalyze decomposition of the heavy hydrocarbon distillate and the lignocellulosic biomass, thereby activating decomposition of the heavy hydrocarbon distillate. Therefore, the method according to the present invention can be useful in obtaining a synergic effect on pretreatment of the lignocellulosic biomass and the heavy hydrocarbon distillate.

DESCRIPTION OF DRAWINGS

FIG. 1 is a graph illustrating the results obtained by analyzing a vacuum residue using an ASTM high-temperature SIMDIS method;

FIG. 2 is a graph illustrating boiling point distribution characteristics of a vacuum residue used in Examples of the present invention;

FIG. 3 is a diagram showing a reactor used in Examples of the present invention;

FIG. 4 is a flowchart illustrating a method of reforming a heavy hydrocarbon distillate used in Example 1 of the present invention;

FIG. 5 is a flowchart illustrating a method of reforming a heavy hydrocarbon distillate used in Example 2 of the present invention;

FIG. 6 is a graph illustrating compositional distributions of the products prepared in Examples and Comparative Examples of the present invention.

BEST MODE

The present invention is directed to providing a method of reforming a heavy hydrocarbon distillate, which includes treating a heavy hydrocarbon distillate and a lignocellulosic biomass with a solvent.

Hereinafter, the method of reforming a heavy hydrocarbon distillate according to the present invention will be described in further detail.

According to the present invention, the heavy hydrocarbon distillate is converted into a hydrocarbon distillate having a low boiling point by means of the solvent. In this case, reformation of the heavy hydrocarbon distillate may be performed in a subcritical or supercritical state.

The heavy hydrocarbon distillate may include a hydrocarbon distillate with a boiling point of 360° C. or higher, particularly a hydrocarbon distillate which is deasphalted and has a boiling point of 360° C. or higher, and more particularly a hydrocarbon distillate which is deasphalted and has a boiling point of 530° C. or higher.

For example, the heavy hydrocarbon distillate may include crude oil, an atmospheric residuum, a vacuum residue, a hydrogenation reaction residue, sand oil, or a mixture thereof, and may include a vacuum residue.

In the present invention, the heavy hydrocarbon distillate may also include some of a hydrocarbon distillate with a boiling point of less than 360° C., and a hydrocarbon distillate in which a portion of an insoluble material is which can be dissilved in an aromatic solvent or an aliphatic hydrocarbon solvent.

In the present invention, the lignocellulosic biomass is easily decomposed through a catalytic action of a sulfur compounds produced by a decomposition reaction of the heavy hydrocarbon distillate, and oxygen, hydroxymethylfurfural (HMF), levulinic acid, formic acid and sulfuric acid produced by decomposition of the lignocellulosic biomass catalyzes decomposition of the heavy hydrocarbon distillate and the lignocellulosic biomass.

The kind of the lignocellulosic biomass is not particularly limited. For example, any kind of biomasses widely used in the related art may be used as the lignocellulosic biomass. In the present invention, for example, a crushed material of a woody plant such as wood chips or coconut shell may be used, and an extracts from the woody plants may also be used.

Cellulose, hemicellulose, lignin or a mixture thereof may be used as the extract. In addition to the extract from the plant, materials synthesized in laboratories may also be used in the present invention.

The lignocellulosic biomass may be included at a content of 10 to 90 parts by weight, particularly 40 to 75 parts by weight, and more particularly 50 to 70 parts by weight, based on 100 parts by weight of the heavy hydrocarbon distillate. Within this content range, catalytic effects of products (oxygen, HMF, levulinic acid, formic acid, and sulfuric acid) produced upon decomposition of the lignocellulosic biomass and products (a sulfur compounds, etc) produced upon decomposition of the heavy hydrocarbon distillate may be maximized.

Since reformation of the hydrocarbon distillate according to the present invention is performed in a subcritical or supercritical state, the solvent behaves as a liquid phase similar to a gas due to the presence of the subcritical or supercritical state. In this case, the solvent has improved diffusion characteristics due to decrease in viscosity. Here, the term "supercritical state" refers to a state of a solvent over critical temperature and a critical pressure. Also, the term "subcritical state" refers to a state of a solvent which is lower than a critical temperature or a critical pressure or is close to a supercritical condition. When the solvent is close to a critical point, that is, in a subcritical or supercritical state, the solvent shows an excellent hydrogen-transporting ability, and an excellent ability to dissolve a tar-forming precursor which is an intermediate of the heavy hydrocarbon distillate.

In the present invention, the type of the solvent is not particularly limited. For example, an aromatic solvent, an aliphatic hydrocarbon solvent or a mixed solvent thereof may be used as the solvent. Xylene (particularly, meta-xylene), tetralin or a mixture thereof may be used as the aromatic solvent, and dodecane (particularly, a normal dodecane), decaline or a mixture thereof may be used as the aliphatic hydrocarbon solvent. In the solvent, the boiling point of the heavy hydrocarbon distillate may be easily reduced, and a higher value-added hydrocarbon distillate may be produced. In the present invention, when a mixed solvent of two or more components selected from xylene, tetralin, dodecane and decaline as described above is used as the solvent, the contents of the xylene, tetralin, dodecane and/or decaline included in the mixed solvent are not particularly limited, and each component may be included at a content of at least 25 parts by weight, based on 100 parts by weight of the mixed solvent.

The solvent may be used at a content of 100 to 2,000 parts by weight, particularly 900 to 1500 parts by weight, and more particularly 900 to 1400 parts by weight, based on 100 parts by weight of the heavy hydrocarbon distillate. Within this content range, the boiling point of the heavy hydrocarbon distillate may be easily reduced, and a higher value-added hydrocarbon distillate may be produced.

Reformation of the heavy hydrocarbon distillate according to the present invention may be performed by treating the heavy hydrocarbon distillate and the lignocellulosic biomass with the solvent, as described above.

In this case, the treatment with the solvent may be performed by simultaneously treating a mixture of the heavy hydrocarbon distillate and the lignocellulosic biomass with the solvent, or may be performed by treating the heavy hydrocarbon distillate with the solvent to produce a product and allowing the product to react with the lignocellulosic biomass.

Hereinafter, a method of reforming a heavy hydrocarbon distillate performed according to the first of these methods is referred to as a 'single simultaneous treatment method,' and a method of reforming a heavy hydrocarbon distillate performed according to the second of these methods is referred to as a '2-step simultaneous treatment method.'

In the present invention, the 'single simultaneous treatment method' is performed by simultaneously treating the heavy hydrocarbon distillate and the lignocellulosic biomass with the solvent, as described above. Treatment of the heavy hydrocarbon distillate and the lignocellulosic biomass with the solvent may be performed through a hydrogenation reaction. More particularly, hydrogen is added when the heavy hydrocarbon distillate and the lignocellulosic biomass are treated with the solvent, thereby facilitating the hydrogenation reaction. In this case, the hydrogen may have a partial pressure of 0.1 to 10 MPa, particularly, 3 to 8 MPa.

The hydrogenation reaction may be performed at a temperature of 300 to 500° C., particularly 380 to 400° C., for 10 to 100 minutes, particularly 30 to 60 minutes. Within these temperature and time ranges, the heavy hydrocarbon distillate can be easily converted into a light hydrocarbon distillate.

In the present invention, a catalyst may be further used to improve the reaction efficiency of hydrogenation of the heavy hydrocarbon distillate with the solvent.

A metal catalyst or activated carbon may be used as the catalyst.

The metal catalyst may include iron (Fe), lithium (Li), nickel (Ni) or a mixture thereof as a metal component, and may be used as a homogeneous catalyst in a state in which it is dispersed in a liquid phase without a support. More particularly, the iron (Fe), lithium (Li) and nickel (Ni) may be used in the form of an oxide, and more particularly, $Fe_2O_3$ or $Fe_3O_4$.

Also, the activated carbon may be treated with an acid to increase a number of acid sites on a surface of the activated carbon. Upon acid treatment, hydrochloric acid, sulfuric acid, nitric acid and the like may be used as the acid. More particularly, sulfuric acid may be used as the acid for catalyst treatment. The acid treatment may be performed using conventional methods known in the related art.

The content of the catalyst is not particularly limited, and may be properly adjusted according to reaction conditions, and the like.

In the sulfur compound produced upon decomposition of the heavy hydrocarbon distillate in the 'single simultaneous treatment method,' the sulfur components serve as a usual sulfur catalyst used in decomposition of cellulose to facilitate decomposition of the lignocellulosic biomass. Also, the oxygen, hydroxymethylfurfural (HMF), levulinic acid, formic acid and sulfuric acid produced upon decomposition of the lignocellulosic biomass serve to make the reaction condition acidic and catalyze decomposition of the heavy hydrocarbon distillate, thereby enhancing production efficiency of the higher value-added light hydrocarbon distillate.

In the present invention, the '2-step simultaneous treatment method' may also be performed, as described above, by treating the heavy hydrocarbon distillate with the solvent to produce a product; and allowing the product to react with the lignocellulosic biomass.

In the '2-step simultaneous treatment method,' the output of the product may be performed through a hydrogenation reaction. More particularly, when the heavy hydrocarbon distillate is treated with the solvent, hydrogen is further added to facilitate the hydrogenation reaction. In this case, the hydrogen may have a partial pressure of 0.1 to 10 MPa.

Upon treatment of the heavy hydrocarbon distillate with the solvent, the reaction may be performed at a temperature of 300 to 500° C., particularly 380 to 400° C., for 10 to 100 minutes, particularly 30 to 60 minutes. Within these temperature and time ranges, the heavy hydrocarbon distillate can be easily converted into a light hydrocarbon distillate.

According to the present invention, a catalyst may be further used to improve the reaction efficiency of hydrogenation of the heavy hydrocarbon distillate with the solvent. In this case, the kinds of catalysts described above may be used as the catalyst.

In this process, the heavy hydrocarbon distillate is converted into a higher value-added light hydrocarbon distillate, and the sulfur compounds are produced.

In the 2-step simultaneous treatment method according to the present invention, the reaction of the product with the lignocellulosic biomass may be performed through a thermal reaction.

The thermal reaction may be performed at a temperature of 300 to 500° C., particularly 380 to 400° C., and a pressure 3 to 20 MPa, particularly 3 to 9 MPa, and more particularly 3 to 7 MPa, for 10 to 100 minutes, particularly 30 to 60 minutes.

The thermal reaction may be generally performed without adding hydrogen, but may be performed after addition of hydrogen when necessary.

Also, the thermal reaction may be performed in the presence of a catalyst. In this case, the catalyst used in the previous treatment with the solvent may be used to catalyze the thermal reaction, and another catalyst may be added to perform the thermal reaction.

In the operation, decomposition of the lignocellulosic biomass is carried out. Upon the decomposition of the lignocellulosic biomass, the sulfur components of the sulfur compound produced in the previous operation serve as a usual sulfur catalyst used for decomposition of cellulose to facilitate decomposition of the lignocellulosic biomass. Also, the oxygen, hydroxymethylfurfural (HMF), levulinic acid, formic acid and sulfuric acid produced upon the decomposition of the lignocellulosic biomass make the reaction condition acidic, and thus catalyze decomposition of the heavy hydrocarbon distillate which is not reacted in the previous operation.

Reformation of the heavy hydrocarbon distillate according to the present invention may be easily performed in a batch-type device or a continuous device.

The modification of the heavy hydrocarbon distillate using the batch-type device or the continuous device may be performed using conventional methods known in the related art. For example, when the batch-type device is used, reformation of the heavy hydrocarbon distillate may be performed in the same manner as in Examples of the present invention.

Mode for Invention

Hereinafter, preferred embodiments of the present invention will be described in detail referring to the accompanying drawings. Prior to the description, it should be understood that the terms used in the specification and appended claims should not be construed as limited to general dictionary meanings, but interpreted based on the meanings and concepts corresponding to technical aspects of the present invention on the basis of the principle that the inventor is allowed to define terms appropriately for the best explanation. Therefore, the description proposed herein is merely a preferable example for the purpose of illustration only, and not intended to limit the scope of the invention, so it should be understood that other equivalents and modifications can be made thereto without departing from the scope of the invention.

EXAMPLES

1) Preparation of Sample
(1) Heavy Hydrocarbon Distillate

A vacuum residue (VR) provided through a conventional process was used as a heavy hydrocarbon distillate sample. The sample was analyzed using an ASTM high-temperature SIMDIS method. The results are shown in FIG. 1, and the boiling point distribution characteristics are shown in FIG. 2 As show in FIGS. 1 and 2, the vacuum residue contained a pitch component (boiling point: 525° C. or higher) at a content of approximately 90% or higher, and the pitch component was recovered at a content of 62.6% by mass at a temperature of 750° C. The chemical characteristics of the sample are listed in the following Table 1.

TABLE 1

| | |
|---|---|
| CCR (% by weight) | 23.03 |
| S (% by weight) | 5.32 |
| N (% by weight) | 0.289 |
| Ni (wppm) | 38.4 |
| V (wppm) | 104.2 |
| Fe (wppm) | 23.2 |
| Viscosity (cSt, 100° C.) | 3,580 |
| Cut point (% by weight) | |
| Naphtha | 0.0 |
| Middle distillate | 0.0 |
| Vacuum gas oil | 5.8 |
| residue (525 to 750° C.) | 56.8 |

As listed in Table 1, the viscosity of the vacuum residue was very high, and the high contents of sulfur and nitrogen were 5.32% by weight and 0.289% by weight, respectively.

(2) Lignocellulosic Biomass

α-Cellulose (commercially available from Sigma-Aldrich) was used as the lignocellulosic biomass.

(3) Solvent n-Dodecane (chromasolv-HPLC grade), m-xylene and tetralin (anhydrous, 99%) (commercially available from Sigma-Aldrich) were used as the solvents in Examples and Comparative Examples.

More particularly, n-dodecane was used as the solvent in Examples 1, 2, 4 and Comparative Example 1, m-xylene was used as the solvent in Example 3 and Comparative Example 2, and n-dodecane and tetralin were used as the solvent in Example 5.

Physical properties of the solvent are listed in the following Table 2.

TABLE 2

| Solvent | Density (g/ml) | Boiling point (° C.) | $T_c$ (° C.) | $P_c$ (MPa) |
|---|---|---|---|---|
| n-dodecane | 0.748 | 216.4 | 385.2 | 1.82 |
| m-xylene | 0.864 | 137 | 344.2 | 3.54 |
| tetralin | 0.973 | 207 | 445.9 | 3.51 |

(4) Hydrogen Gas

Hydrogen gas was compressed and fed into a reactor using a high-pressure regulator H-YR-5062 in which a distribution pressure was in a range of 0 to 15 MPa.

(5) Catalyst

Activated carbon (Calgon F-300: coal-derived activated carbon) was used as the catalyst in Examples 1, 2 and 3 and Comparative Examples 1 and 2, and $Fe_2O_3$ (commercially available from Sigma-Aldrich) was used as the catalyst in Examples 4 and 5. The activated carbon was treated with sulfuric acid to increase a number of acid sites on a surface of the activated carbon, as follows.

First, particulates of activated carbon was treated with concentrated hydrochloric acid and hydrofluoric acid to remove ash components from the activated carbon, and then dried overnight in a oven at a temperature of 120° C. in air conditions. Thereafter, the inner part of a flask equipped with a water reflux condenser was chemically modified with concentrated sulfuric acid (96% by weight) at 250° C. for 3 hours. After the chemical modification, the activated carbon was washed with deionized distilled water (until no more sulfates were included in the activated carbon), and then dried overnight at 120° C. After the acid treatment, the activated carbon was re-treated with a toluene solvent according to a Soxhlet procedure.

2) Structure of Reactor

This experiment was performed in a lab-scale batch-type reactor (designed to endure temperature up to 873 K and pressure 40 MPa). The schematic configuration of the device used in this experiment is shown in FIG. 3 (i.e., a reactor).

The reactor 205 was made of Inconel 625 which is a nickel-based alloy, and its volumetric capacity was approximately 200 ml. An electric furnace was used as a heater 204 (heating rate: approximately 30 K/min). The reaction temperature was directly measured using a pair of thermocouples (installed respectively at the centers of the reactor and the heating furnace), and the temperature was adjusted within 5 K using a temperature regulator 206. The activated carbon catalyst was put into a Carberry-type spinning basket to fix the catalyst supported therein so as to prevent damage of the activated carbon catalyst caused due to agitation by an impeller and contact with a solution. A metal catalyst was mixed with a heavy hydrocarbon distillate and a lignocellulosic biomass in a solvent, and the resulting mixture was put into a reactor. Here, a pitched raddle-type impeller was used as the impeller. The agitation speed was adjusted within 0 to 600 rpm under the control of a speed controller 202 using a high-pressure agitator 203.

Example 1

Single Simultaneous Treatment Method (Dod-Simultaneous Treatment (AC))

3 g of a vacuum residue sample and n-dodecane solvent were mixed for approximately 20 minutes through sonication. In this case, the solvent and the vacuum residue were mixed at a weight ratio of 10:1. The resulting mixture was put into a reactor, 2 g of cellulose and 8 g of an acid-treated activated carbon catalyst were added, and the reactor was closed. Thereafter, the reactor was purged with nitrogen gas for 10 minutes to remove the air, and the reactor was heated at a heating rate of approximately 30 K/min. When the temperature in the reaction reached 380° C., compressed hydrogen gas was supplied from a hydrogen cylinder 201 to the reactor 205. After the temperature in the reactor reached the reaction temperature (400° C.), the reaction was maintained for 30 to 60 minutes. In this case, the reaction pressure was 7.53 MPa, and the solvent (n-dodecane) was in a supercritical state.

After a lapse of predetermined reaction time, the reactor was removed from the heating furnace 204, and then quenched in water to room temperature. When the temperature in the reactor reached room temperature, gas components in the reactor were collected in a gas bag. Liquid/solid phase products were completely recovered from the reactor using 10 ml of the same solvent. To measure an amount of hydrogen consumed upon the reaction, a reaction system pressure was recorded at the same temperature (380° C.) during heating and cooling procedures.

This experimental method using the single simultaneous treatment method is shown in FIG. 4.

Example 2

2-Step Simultaneous Treatment Method (Dod-2Step (AC))

Heavy hydrocarbon distillate was reacted in supercritical n-dodecane under 400° C. and 6.76 MPa, as in Example 1 except for the use of cellulose at this step (step 1), after the first step the cellulose was then put into the reactor, and the catalyst was replaced with fresh activated carbon. The reactor was again purged with nitrogen gas for 10 minutes to remove air remained in the reactor, and then the reactor was heated again to 400° C. without addition of hydrogen. Thereafter, this experiment was performed in the same manner as in Example 1, except that a reaction (thermal cracking) was performed in n-dodecane in a supercritical state at 4.22 MPa for 30 minutes to 60 minutes (step 2).

This experimental method using the 2-step simultaneous treatment method is shown in FIG. 5.

Example 3

2-Step Simultaneous Treatment Method (Xyl-2Step (AC))

This experiment was performed in the same manner as in Example 2 at 400° C., except that the reaction pressure in step 1 was 8.86 MPa, and the reaction pressure in the step 2 was 5.90 MPa. Also supercritical m-xylene was used as the solvent instead of n-dodecane.

Example 4

Single Step Simultaneous Treatment Method (Dod-Simultaneous Treatment (Fe))

This experiment was performed in the same manner as in Example 1, except that 0.71 g of $Fe_2O_3$ was used as the catalyst, the reaction temperature and pressure were 400° C. and 6.73 MPa, respectively, and supercritical n-dodecane was used as the solvent.

Example 5

2-Step Simultaneous Treatment Method (Dod-2Step (Fe+Tetra))

n-Dodecane in a supercritical condition was used under conditions of 400° C. and 5.56 MPa, as in Example 1 except for the use of cellulose (step 1), then the cellulose and 19.46 g of tetralin were added into the reactor.

The inner part of the reactor was purged again with nitrogen gas for 10 minutes to remove air in the reactor, and then heated again to 400° C. without addition of hydrogen. Thereafter, this experiment was performed in the same manner as in Example 1, except that the reaction (thermal cracking) was performed on supercritical n-dodecane and subcritical tetralin at 3.69 MPa for 30 minutes to 60 minutes (step 2).

Comparative Example 1 (Dod (AC)

This experiment was performed in the same manner as in Example 1, except that the cellulose used in Example 1 was not used, and n-dodecane in a supercritical state was used as the solvent under the conditions of 400° C. and 6.07 MPa.

Comparative Example 2 (Xyl (AC)

This experiment was performed in the same manner as in Example 1, except that the cellulose used in Example 1 was not used, and m-xylene in a supercritical state was used as the solvent instead of n-dodecane under the conditions of 400° C. and 8.18 MPa.

Separation and Content Measurement of Products Produced in Examples and Comparative Examples Components (remained in the reactor) produced in Examples and Comparative Examples were filtered through a Grade GF/F Whatman glass fiber filter to separate a solid product. Thereafter, amounts of naphtha (boiling point: IBP to 177° C.), a middle distillate (boiling point: 177 to 343° C.), a gas oil (boiling point: 343 to 525° C.) and a residue (boiling point: 525° C. or higher) in the reaction product were measured according to a gas chromatography distillation SIMDIS ASTM 7213A-7890 method.

Coke powder (a toluene insoluble (TI) component) and a produced distillate were separated and extracted from the solid product by means of a Soxhlet method using toluene as the solvent. The TI distillate was dried at 140° C. for 4 hours in nitrogen gas, and the weight of the TI distillate was then measured. Oil components were also completely extracted from the used catalyst by means of Soxhlet extraction using toluene as the flushing solvent. A Soxhlet extraction solution was recovered, and evaporated at 200° C. under reduced pressure conditions in a flask, after complete removal of toluene, remaining liquid was mixed with the solution sample recovered from the reaction.

After Soxhlet extraction and drying at 100° C. in nitrogen atmosphere, the weight increase of the catalyst was referred as a coke produced during the reaction and attached to the surface of the catalyst. An amount of coke (including carbon and coke powder attached to the surface of the catalyst) was introduced into a mass balance equation to calculate cut-off distributions of the naphtha, the middle distillate, the gas oil and the residue.

Finally, the conversion rates of the coke and the residue were calculated using the following Equations 1 and 2 (excluding coke produced during the reaction). It was confirmed that an average mass balance for all the experiments was calculated to be greater than or equal to 99%.

Coke (% by mass)=Mass of coke powder (% by mass)+Mass of carbon attached to catalyst (% by mass)   Equation 1

Conversion rate (% by mass)=[(Mass of vacuum residue (in supply source)+Mass of lignocellulosic biomass (in supply source)−Mass of residue (in product)−Mass of coke−Mass of water (in product))/(Mass of vacuum residue (in supply source)+Mass of lignocellulosic biomass (in supply source))]×100−5.8 (vacuum gas oil in supply source(% by mass))   Equation 2

In the present invention, FIG. 6 illustrates compositional distributions and conversion rates of the products prepared by the methods used in Examples 1 to 5 and Comparative Examples 1 and 2.

In FIG. 6, Dod (AC) and Xyl (AC) were obtained by treating a vacuum residue using n-dodecane and m-xylene as solvents, respectively, and using activated carbon as a catalyst without using cellulose (Comparative Examples 1 and 2). Dod-simultaneous treatment (AC) was treated using n-dodecane and activated carbon as the solvent and the catalyst, respectively, and using the single simultaneous treatment method (Example 1). Dod-2step (AC) and Xyl-2step (AC) was treated using n-dodecane and m-xylene as the solvents, respectively, using activated carbon as the catalyst, and using the 2-step simultaneous treatment method (Examples 2 and 3). Also, Dod-simultaneous treatment (Fe) was treated using n-dodecane and $Fe_2O_3$ as the solvent and the catalyst, respectively, and using the single simultaneous treatment method (Example 4). Dod-2step (Fe+Tetra) was treated using n-dodecane and tetralin as the solvent with using $Fe_2O_3$ as the catalyst, and using the 2-step simultaneous treatment method (Example 5).

In the case of the Dod-simultaneous treatment (AC) (Example 1), it was revealed that the conversion rate into liquid phase products (naphtha, middle distillate, and vacuum gas oil) was 62.59% by mass, which was lower than that of Dod (AC) (Comparative Example 1) (78.54% by mass).

From the compositional distributions of the reaction product obtained in the Dod-simultaneous treatment (AC) (Example 1) and the reaction product obtained in the Dod (AC) (Comparative Example 1), however, it can be seen that there was a significant difference in the compositional distributions in the products, depending on the addition of cellulose. In particular, there was unreacted residue when cellulose was not added, whereas the unreacted residue was not observed when the cellulose was added to the reaction, and the total amount of coke, especially an amount of coke in the catalyst, increased. Also, when cellulose was added to the reaction, the yields of the vacuum gas oil and the middle distillate, which have relatively high boiling points, were reduced comparing to the case when the cellulose was not added. In particular, when the cellulose was added, naphtha, which has a low boiling point distillate (i.e., a light fraction), had a yield 28.69%, which was approximately 9% higher than that of the naphtha (19.63%) obtained by the conventional method when the cellulose was not added.

It was revealed that when the Dod-simultaneous treatment (AC) (Example 1) was used, the conversion of the entire vacuum residue was reduced, but the product had a lower low boiling point, and the content of naphtha useful as gasoline was increased.

As described above, the compositional distribution correlated with addition of the cellulose to the reaction. The sulfur components in the vacuum residue may serve as a conventional sulfur catalyst used for the decomposition of cellulose. Also, the oxygen, hydroxymethylfurfural (HMF), levulinic acid, formic acid and sulfuric acid produced during the decomposition of cellulose also make the reaction conditions more acidic which may catalyze decomposition of the vacuum residue, thereby inducing production of lighter products than those of the previous reaction when cellulose is not added, and thus a larger amount of the low boiling point distillate (light fraction) such as naphtha is produced.

Water was not observed in the product in the case of the hydrogenation reaction in which the cellulose was not added, but water was confirmed to be formed when the cellulose was added. Accordingly, it could be seen that the addition of the cellulose catalyzed the entire reaction to affect production of the products and remnants.

Also, in the case of the Dod-2step (AC) (Example 2) using n-dodecane as the solvent, the middle distillate had a conversion ratio of 23.17%, which was much lower than the conversion ratio (33.63%) of the Dod-simultaneous treatment (Ac) (Example 1), but the overall conversion ratio of the middle distillate and naphtha was substantially similar to that of Dod (AC) (Comparative Example 1) in which the reaction was performed without addition of cellulose.

However, it was confirmed that the conversion ratio into naphtha in the Dod-2step (AC) (Example 2) was 45.99%, indicating that a larger amount of naphtha was produced, compared to the Dod-simultaneous treatment (AC) (Example 1). Such conversion ratio was higher than that of the Dod (AC) (Comparative Example 1) in which the cellulose was not added. In particular, it could be seen that most of the vacuum gas oil and the residue were converted into naphtha since the vacuum gas oil and the residue were not observed in the product.

Also, even when m-xylene was selected as the solvent in the 2-step simultaneous treatment (Xyl-2step (AC), Example 3), the vacuum gas oil and the residue were not produced, but the conversion ratio into a higher value-added distillate having a low boiling point (i.e., a middle distillate and naphtha) increased.

As described above, it could be seen that the 2-step simultaneous treatment method had an influence on production of a larger amount of naphtha and a light fraction, compared with when the vacuum residue was treated without addition of cellulose and when the single simultaneous treatment method was used. It was revealed that when an aromatic solvent was selected instead of an n-alkene-based solvent to perform the 2-step simultaneous treatment method, the content of the light hydrocarbon distillate (middle distillate and naphtha) in the product was significantly increased, compared with when the treatment was performed without addition of cellulose.

From the compositional distributions of the reaction products obtained in the Dod-simultaneous treatment (Fe) (Example 4) and the reaction products obtained in the Dod-simultaneous treatment (AC) (Example 1), it can also be seen that there was a significant difference in the compositional distributions in the products, depending on the catalyst used in the reaction. More particularly, no unreacted residue was observed when the activated carbon catalyst was used, but there was an unreacted residue when the $Fe_2O_3$ catalyst was used, and a total amount of coke, especially an amount of coke in the catalyst, increased. Also, the vacuum gas oil and the middle distillate, which have relatively high boiling points, were produced with a higher yield than when the activated carbon catalyst was used. In particular, the middle distillate had a yield of 60.69% when the $Fe_2O_3$ catalyst was used, which was approximately 27% higher than the yield (33.63%) obtained when the activated carbon catalyst was used.

It was shown that the content of the unreacted residue in the final products when the $Fe_2O_3$ catalyst was used was slightly higher, but the middle distillate and the vacuum gas oil were mainly produced as the products, and the content of the middle distillate and vacuum gas oil fraction useful as gasoline or kerosene increased.

Also, in the case of the 2-step simultaneous treatment method (Dod+2step (Fe+Tetra)) (Example 5) using n-dodecane and tetralin as the solvents, the conversion ratio of the naphtha was 2.18%, which is much lower than the conversion ratio (45.99%) obtained in the Dod+2step (AC) (Example 2 in which only n-dodecane was used as the solvent), but the overall conversion ratio of the middle distillate and the vacuum gas oil was shown to be much higher. Therefore, when tetralin was added to the reaction in the second step, the middle distillate and the vacuum gas oil product rather than naphtha were produced, and the content of the middle distillate and vacuum gas oil fraction useful as gasoline or kerosene increased.

As described above, it can be seen that when the 2-step simultaneous treatment method was used to treat the heavy hydrocarbon distillate and the lignocellulosic biomass with the solvent using the activated carbon catalyst, the conversion rate and the selectivity to the higher value-added (low boiling point) distillate were improved, compared to the single simultaneous treatment method. On the other hand, when the treatment was performed using the $Fe_2O_3$ catalyst and tetralin, the overall conversion ratio was higher than in the single simultaneous treatment and the 2-step simultaneous treatment using the activated carbon catalyst. In addition the selectivity to the vacuum gas oil and middle distillate, which have relatively high boiling points, was improved.

INDUSTRIAL APPLICABILITY

The method of reforming a heavy hydrocarbon distillate according to the present invention can be easily applied to a mass production process in oil refining companies.

What is claimed is:

1. A method of reforming a heavy hydrocarbon distillate, comprising:
    simultaneous treatment of a mixture of the heavy hydrocarbon distillate and a lignocellulosic biomass with a solvent,
    wherein the simultaneous treatment is conducted under supercritical state,
    wherein the solvent is dodecane, xylene, tetralin, or a mixture thereof,
    wherein the simultaneous treatment is conducted at a hydrogen partial pressure of 3 to 8 MPa,
    wherein the simultaneous treatment is conducted at a temperature of 380-400° C.,
    wherein the simultaneous treatment is conducted in the presence of a catalyst,
    wherein the catalyst is acid-treated activated carbon, and
    wherein a content of the lignocellulosic biomass is in a range of 50 to 90 parts by weight, based on 100 parts by weight of the heavy hydrocarbon distillate.

2. The method of claim 1, wherein the heavy hydrocarbon distillate comprises a hydrocarbon distillate having a boiling point of 360° C. or higher.

3. The method of claim 1, wherein the heavy hydrocarbon distillate is crude oil, an atmospheric residuum, a vacuum residue, a hydrogenation reaction residue, sand oil, or a mixture thereof.

4. The method of claim 1, wherein the lignocellulosic biomass is cellulose, hemicellulose, lignin, or a mixture thereof.

5. The method of claim 1, wherein a content of the lignocellulosic biomass is in a range of 50 to 70 parts by weight, based on 100 parts by weight of the heavy hydrocarbon distillate.

6. The method of claim 1, wherein a content of the solvent is in a range of 100 to 2,000 parts by weight, based on 100 parts by weight of the heavy hydrocarbon distillate.

7. A method of reforming a heavy hydrocarbon distillate, comprising:
- reforming the heavy hydrocarbon distillate with a solvent to produce a product; and
- reacting the product with a lignocellulosic biomass,
- wherein the reforming is conducted under supercritical state,
- wherein the solvent is dodecane, xylene, tetralin, or a mixture thereof,
- wherein the reforming is conducted at a hydrogen partial pressure of 3 to 10 MPa,
- wherein the reacting is conducted at a pressure of 3 to 7 MPa,
- wherein the reforming is conducted at a temperature of 380-400° C.,
- wherein the reforming is conducted in the presence of a catalyst,
- wherein the catalyst is acid-treated activated carbon, and
- wherein a content of the lignocellulosic biomass is in a range of 50 to 90 parts by weight, based on 100 parts by weight of the heavy hydrocarbon distillate.

* * * * *